(12) United States Patent
Wu et al.

(10) Patent No.: US 10,695,695 B2
(45) Date of Patent: Jun. 30, 2020

(54) SEDIMENTATION TANK CAPABLE OF AUTOMATICALLY ADJUSTING LIQUID LEVEL AND FLOW

(71) Applicant: Beijing Jinhong Tianbang Information Technology Co., ltd, Beijing (CN)

(72) Inventors: Yuzhu Wu, Tianjin (CN); Jun Xia, Tianjin (CN); Xingyue Wu, Tianjin (CN); Yuchen Xia, Tianjin (CN); Liming Zhou, Tianjin (CN)

(73) Assignee: Beijing Hongming Xinda Technology CO., LTD, Beijing (CN)

( * ) Notice: Subject to any disclaimer, the term of this patent is extended or adjusted under 35 U.S.C. 154(b) by 56 days.

(21) Appl. No.: 16/008,035

(22) Filed: Jun. 14, 2018

(65) Prior Publication Data

US 2018/0290079 A1  Oct. 11, 2018

(30) Foreign Application Priority Data

Oct. 10, 2017  (CN) .......................... 2017 1 0934393

(51) Int. Cl.
*B01D 21/02* (2006.01)
*B01D 17/032* (2006.01)
(Continued)

(52) U.S. Cl.
CPC ......... *B01D 21/02* (2013.01); *B01D 17/0214* (2013.01); *B01D 17/12* (2013.01); *B01D 21/003* (2013.01); *B01D 21/10* (2013.01); *B01D 21/245* (2013.01); *B01D 21/34* (2013.01); *B01D 21/2444* (2013.01); *C02F 1/40* (2013.01)

(58) Field of Classification Search
CPC .............. B01D 17/0214; B01D 21/003; B01D 21/2405; B01D 21/2444; B01D 21/245; B01D 21/34; C02F 1/40; E03F 5/16
(Continued)

(56) References Cited

U.S. PATENT DOCUMENTS 306,169 A * 10/1884 Moseley ................... C02F 1/02
                                                        210/540
1,032,458 A *  7/1912 White ................ B01D 21/0018
                                                        210/540
(Continued)

FOREIGN PATENT DOCUMENTS

CN     205420066     8/2016
CN     205821099    12/2016

*Primary Examiner* — Christopher Upton
(74) *Attorney, Agent, or Firm* — Tony Hom, Esq.

(57) ABSTRACT

The present disclosure provides a sedimentation tank capable of automatically adjusting liquid level and flow, which comprises one or more sedimentation cells which are connected in sequence, a water inlet pipe is arranged on the left side of the leftmost sedimentation cell; the front end of the water inlet pipe is bent and the input port of it is close to the wall; the highest point of the connecting pipe is lower than the highest point of the grease discharge port of the corresponding sedimentation cell, when the liquid level in the sedimentation cell reaches the discharge level of the connecting pipe, the connecting pipe automatically adjusts the flow according to different discharge level so as to adjust the liquid level of the sedimentation cell, and the settled sewage is discharged out of the tank or discharged into the next-stage sedimentation cell until the last stage, and finally discharged. The sedimentation tank has a compact and attractive structure and high space utilization, and different connecting pipe structures can be selected specifically, so as to change the capacity of adjusting the liquid level and flow of the sedimentation tank, and the sewage separation effect is thorough.

13 Claims, 3 Drawing Sheets

(51) Int. Cl.
    *B01D 21/24*     (2006.01)
    *B01D 17/02*     (2006.01)
    *B01D 21/34*     (2006.01)
    *B01D 17/12*     (2006.01)
    *B01D 21/00*     (2006.01)
    *C02F 1/40*     (2006.01)

(58) Field of Classification Search
    USPC ............. 210/519, 521, 522, 532.1, 534, 540
    See application file for complete search history.

(56) References Cited

U.S. PATENT DOCUMENTS

| | | | | |
|---|---|---|---|---|
| 1,069,040 | A * | 7/1913 | Steuer | B01D 21/02 |
| | | | | 210/534 |
| 1,612,557 | A * | 12/1926 | Weisgerber | B01D 17/0211 |
| | | | | 210/540 |
| 2,808,933 | A * | 10/1957 | Mobley | B01D 17/0214 |
| | | | | 210/532.1 |
| 2,907,461 | A * | 10/1959 | Lee | B01D 21/24 |
| | | | | 210/534 |
| 3,907,682 | A * | 9/1975 | Basseet | B01D 21/34 |
| | | | | 210/540 |
| 3,971,719 | A * | 7/1976 | Peters | B01D 17/0214 |
| | | | | 210/540 |
| 5,132,010 | A * | 7/1992 | Ossenkop | E03F 5/16 |
| | | | | 210/522 |
| 7,790,023 | B1 * | 9/2010 | Mills | B01D 21/2444 |
| | | | | 210/540 |
| 8,915,380 | B2 * | 12/2014 | Sowerby | B01D 17/0214 |
| | | | | 210/521 |
| 2017/0326476 | A1 * | 11/2017 | Tuomikoski | B01D 21/2444 |

\* cited by examiner

SEDIMENTATION TANK CAPABLE OF AUTOMATICALLY ADJUSTING LIQUID LEVEL AND FLOW

CROSS-REFERENCE TO RELATED APPLICATION

This application claims priority of Chinese Application No. 2017109343937 filed on Oct. 10, 2017 and entitled "sedimentation tank capable of automatically adjusting liquid level and flow".

TECHNICAL FIELD

The present disclosure relates to the technical field of sewage treatment, especially relates to a sedimentation tank capable of automatically adjusting liquid level and flow.

BACKGROUND ART

The sewage produced by food plants usually contains a small amount of grease, solid substances such as bone slag, and bloody water. If discharged without any treatment, it will result in the following consequences:

1. The direct discharge of sewage will pollute the environment and the smell of sewage is strong, so that the rivers around the factory produce stench and the environment is dirty, messy and bad, which are very detrimental to work.

2. Grease block, bone slag and other hard substances may cause water blockage and influence normal production.

3. Most of the substances contained in the sewage such as grease and solid substances are recyclable substances, which leads to a direct emission of the sewage be bad for the creating profits of businesses, and not in line with the concept of green development.

In the prior art, there are several devices for treatment of sewage of food plant. A utility model patent CN205420066U discloses a sewage treatment system of food plant comprising a hydraulic screen, an oil-water separator, an adjustment tank, an aerosol sedimentation tank, a biochemical tank, an aerobic tank and a sedimentation tank that connected in sequence through pipelines.

A utility model patent CN205821099U discloses a sewage treatment system suitable for a food plant. The sewage treatment system comprises a water inlet pipe, the water inlet pipe is connected with an oil separation tank, and the oil separation tank is connected with an adjusting tank through a pipeline, the adjusting tank is connected with a coagulating sedimentation tank through a pipeline, and the pipeline between the adjusting tank and the coagulating sedimentation tank is provided with a coagulation reactor, the coagulation reactor is connected with a dosing device through a pipeline, the coagulation sedimentation tank is connected with an aerobic biochemical tank through a pipeline, the aerobic biochemical tank is connected with a secondary sedimentation tank through a pipeline, and a standard discharge port is formed in the secondary sedimentation tank. In the utility model patent, the sewage of the food plant enters into the oil separation tank through the water inlet pipe, then enters into the adjusting tank, and generates precipitates in the coagulation sedimentation tank after agents are added by the dosing device, and then passes through the aerobic biochemical tank treatment and finally reaches the standard after being treated by the secondary sedimentation tank.

SUMMARY OF THE INVENTION

The present disclosure provides a sedimentation tank capable of automatically adjusting liquid level and flow, which has a compact and attractive structure and high space utilization, and can be specifically adapted to different connecting pipe structures to change the sedimentation tank capacity of adjusting liquid level and flow, meanwhile, the sewage separation effect is thorough.

The technical solution adopted by the present disclosure is:

a sedimentation tank capable of automatically adjusting liquid level and flow, comprises one or more sedimentation cells which are connected in sequence; wherein, when one sedimentation cell is provided, a water inlet pipe is arranged on the left side of the sedimentation cell, and a connecting pipe used for draining water is arranged on the opposite side of the sedimentation cell; the bottom of the sedimentation cell is obliquely arranged, and a grease discharge port used for discharging grease is formed on the upper side of the inclined surface, and a sediment discharge port used for discharging precipitates is formed on the lower side, wherein the water inlet pipe and the connecting pipe are respectively positioned at the diagonal positions of the sedimentation cell;

when several sedimentation cells are provided, a water inlet pipe is arranged on the left side of the leftmost sedimentation cell; the bottom of each sedimentation cell is obliquely arranged and a grease discharge port used for discharging grease is formed on the upper side of the inclined surface, and a sediment discharge port used for discharging precipitates is formed on the lower side; the adjacent sedimentation cells are connected in sequence through connecting pipes, wherein the inclination direction of bottom of lower-stage sedimentation cell is opposite to that of bottom of upper-stage sedimentation cell; the water inlet pipe and the connecting pipe of the leftmost sedimentation cell are respectively located at the diagonal positions of it; the connecting pipe of next-stage sedimentation cell and the connecting pipe of upper-stage sedimentation cell are located at the diagonal positions of the sedimentation cell respectively; the connecting pipe of the rightmost sedimentation cell is used for discharging water;

the front end of the water inlet pipe is bent and the input port of it is close to the wall of the cell; the highest point of the connecting pipe is lower than the highest point of the grease discharge port of the corresponding sedimentation cell, when the liquid level in the sedimentation cell reaches the discharge level of the connecting pipe, the connecting pipe automatically adjusts the flow according to different discharge level so as to adjust the liquid level of the sedimentation cell, and the settled sewage is discharged out of the sedimentation tank or discharged into the next-stage sedimentation cell until the last stage, and finally discharged out of the tank.

As an improvement of the technical scheme, the connecting pipe comprises several stainless steel pipes fixedly mounted through flanges and/or a length-adjustable telescopic pipe, wherein the connecting pipe is divided into inlet side and outlet side, one or two water inlets are formed in the inlet side, and one water outlet is formed in the outlet side.

Further, one water inlet is formed in the inlet side of the connecting pipe, and one water outlet is formed in one side of the connecting pipe; and above the water inlet, an incomplete funnel-shaped water inlet device is arranged, and the top end face of the water inlet device is inclined towards the inner side of the sedimentation cell; when the liquid level in the sedimentation cell reaches the discharge liquid level of the connecting pipe, the higher the liquid level is, the larger the flow of the connecting pipe is, and the better the effect of adjusting the liquid level of the sedimentation cell is.

Further, the direction of the water outlet is upward so as to reduce the impact of outflow on the sediment at the bottom of the sedimentation cell.

Further, the outlet side of the connecting pipe is formed by a telescopic pipe, so as to adjust the water outlet height and reduce the impact of outflow on the sedimentation of the bottom of the sedimentation cell.

As an improvement of the technical scheme, two water inlets are formed in the inlet side of the connecting pipe, wherein one of the water inlet is formed above the connecting pipe, and the other water inlet is horizontally formed in the middle or lower part of the connecting pipe, and the lower water inlet is used for discharging part of settled sewage to the next-stage sedimentation cell; when the liquid level in the sedimentation cell reaches the discharge liquid level of the upper water inlet of the connecting pipe, and the upper water inlet and the lower water inlet are used for discharging part of settled sewage to the next-stage sedimentation cell; the higher the liquid level is, the larger the flow of the connecting pipe is, the more obvious the effect of adjusting the liquid level in the sedimentation cell is; and one water outlet is formed in outlet side of the connecting pipe, and the direction of it is not limited.

As an improvement of the technical scheme, the sediment discharge port is provided with a switch valve for discharging precipitates after sedimentation is completed.

As an improvement of the technical scheme, a collecting groove used for collecting and discharging the grease blocks is arranged at two sides of the sedimentation cell corresponding to the grease discharge port; wherein one end of the collecting groove is obliquely fixed on the two sides of the sedimentation cell, and the other end is used for collecting grease blocks into barrel through a transition chute.

Further, a detachable protective cover is arranged at the top of the sedimentation cell so as to avoid the influence of externalized weather such as wind and sun on the settlement and to avoid the influence of odor and the like under the external environment.

In the prior art, a utility model patent CN205420066U discloses a sewage treatment system of food plant, its technical solution notices the difference of the sewage treatment in food plant, however the separation is not complete and involved with chemical decomposition reaction and precipitation reaction in the process, so that a part of the recyclable substances are decomposed and cannot be utilized, meanwhile, new precipitates are generated.

And a utility model patent CN205821099U discloses a sewage treatment system suitable for a food plant, while its technical solution is only provided with two-stage sedimentation tank, and also needs to be treated by chemical treatment to form precipitate and improve treatment effect, which also makes the treated product unable to be effectively utilized.

The present disclosure provides a sedimentation tank capable of automatically adjusting liquid level and flow, and the beneficial effects of the present disclosure over prior art are as follows:

1. The sedimentation tank has a compact and attractive structure and high space utilization, and the structure can be flexibly selected according to the to-be-settled sewage; meanwhile, according to the difference among the separation of water and oil, the separation of water and slag, and the separation of oil and water slag, different structures of connecting pipe can be selected specifically, so as to change the capacity of adjusting the liquid level and flow of the sedimentation tank, thereby improving the sedimentation effect.

2. The settlement benefit of the sedimentation tank is high; the front end of the water inlet pipe is close to the wall in order to avoid the impact on sediment in the sedimentation tank; the connecting pipe and the water inlet pipe of the first-stage sedimentation cell is arranged at a diagonal position, the connecting pipe of a subsequent sedimentation cell and the connecting pipe of the previous sedimentation cell are arranged at a diagonal position, and then increasing the sewage sedimentation distance, prolonging the sewage sedimentation time and improving the sedimentation benefit.

3. The sedimentation tank is arranged as a multi-stage sedimentation cell according to needs, so that the sewage separation effect after sedimentation is thorough, so that the separated products can be recycled, such as grease blocks and the like collected by the collecting groove, which can be used for producing the soap, oil refining and the like; the precipitates discharged from the bottom mainly comprise sludge, bone slag and the like, which can be used for producing the fertilizer, animal feed and the like through proper processing; water discharged from the last connecting pipe can also be recycled for other use.

BRIEF DESCRIPTION OF FIGURES

The present disclosure is further described below with reference to the accompanying drawings and specific embodiments.

DETAILED DESCRIPTION

Embodiment 1

Figure 1:
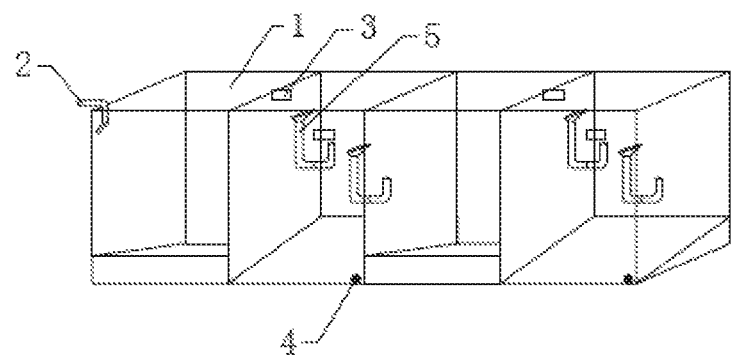
FIG. 1 is a schematic structural diagram of the sedimentation tank according to embodiment 1 of the present disclosure.

With reference to FIG. 1, the present disclosure is a sedimentation tank capable of automatically adjusting liquid level and flow, wherein four sedimentation cells 1 are included; a water inlet pipe 2 is arranged on the left side of the leftmost sedimentation cell 1, and the front end of the water inlet pipe 2 is bent and the input port of it is close to the wall of the leftmost sedimentation cell 1 in order to avoid the impact on sediment at bottom of sedimentation cell 1; the bottom of each sedimentation cell 1 is obliquely arranged and a grease discharge port 3 used for discharging grease is formed on the upper side of the inclined surface, and a sediment discharge port 4 used for discharging precipitates is formed on the lower side; the adjacent sedimentation cells 1 are connected in sequence through connecting pipe 5, wherein the inclination direction of bottom of lower-stage sedimentation cell 1 is opposite to the inclination direction of bottom of upper-stage sedimentation cell 1; the water inlet pipe 2 and the connecting pipe 5 of first-stage sedimentation cell 1 are respectively located at the diagonal positions of it; the connecting pipe 5 of the next-stage sedimentation cell 1 and the connecting pipe 5 of the upper-stage sedimentation cell 1 are located at the diagonal positions of the sedimentation cell 1 respectively; the connecting pipe 5 of fourth-stage sedimentation cell 1 is used for discharging water.

Based on the above structure, the highest point of the connecting pipe 5 is lower than the highest point of the grease discharge port 3 of the corresponding sedimentation cell 1, so as to achieve functionality. When the liquid level in the sedimentation cell 1 reaches the discharge liquid level of the connecting pipe 5, the connecting pipe 5 automatically adjusts the flow (/flow rate) according to different liquid level so as to adjust the liquid level of the sedimentation cell 1, and the settled sewage is discharged or discharged into the next-stage sedimentation cell 1 until the fourth-stage, and finally discharged out of the tank.

Figure 2:
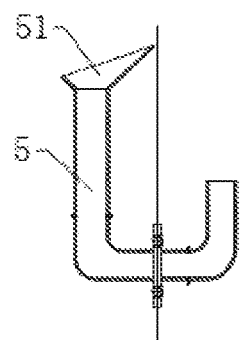
FIG. 2 is an enlarged schematic view for the structure of the connecting pipe of FIG. 1.

With reference to FIG. 2, the connecting pipe 5 comprises several stainless steel pipes fixedly mounted through flanges, and is fixed on the wall of the sedimentation cell 1 through an iron plate screw according to different installation positions. The connecting pipe 5 is divided into inlet side and outlet side, one water inlet is formed in the inlet side of the connecting pipe 5, and one water outlet is formed in outlet side of the connecting pipe 5. An incomplete funnel-shaped water inlet device 51 is arranged above the water inlet; the top end face of the water inlet device 51 is inclined towards the inner side of the sedimentation cell 1 and the inclination degree is adjusted according to needs. When the liquid level in the sedimentation cell 1 reaches the discharge liquid level of the connecting pipe 5, the higher the liquid level is, the larger the flow of the connecting pipe 5 is, the more obvious the effect of adjusting the liquid level in the sedimentation cell 1 is. The direction of the water outlet located in outlet side is upward so as to reduce the impact of outflow on the sediment at the bottom of the sedimentation cell 1. Alternatively, the outlet side of connecting pipe 5 can be changed from a telescopic pipe instead of a stainless steel pipe, so that adjusting the height of outflow, and reducing the impact of the outflow on the sediment of the bottom of the sedimentation cell 1.

Figure 3:
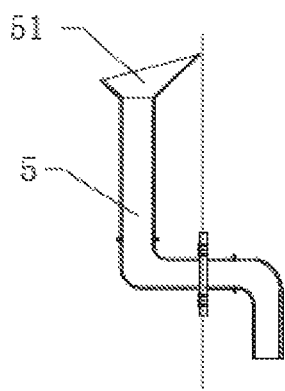
FIG. 3 is a schematic diagram of the connecting pipe according to an embodiment of the present disclosure.

As another embodiment of the present disclosure, with reference to FIG. 3, in the structure of the connecting pipe 5, the inclination of the water inlet device 51 is larger, and when the liquid level in the sedimentation cell 1 reaches the discharge liquid level of the connecting pipe 5, the effect of adjusting the liquid level in the sedimentation cell 1 is much more better. The water outlet on the outlet side of the connecting pipe 5 faces downward, which is regarded as the neglect of the impact on the sediment in the sedimentation cell 1.

Embodiment 2

Figure 4:
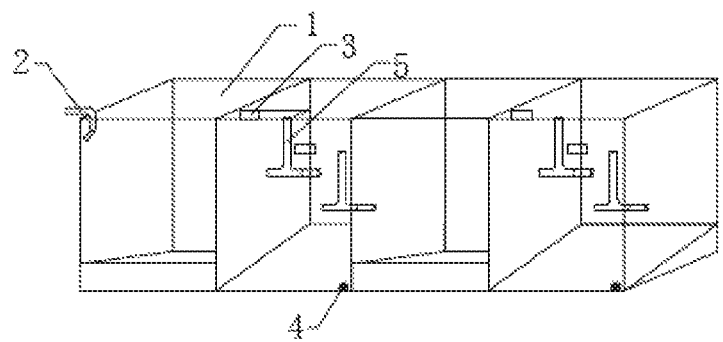
FIG. 4 is a schematic structural diagram of the sedimentation tank according to embodiment 2 of the present disclosure.
Figure 5:
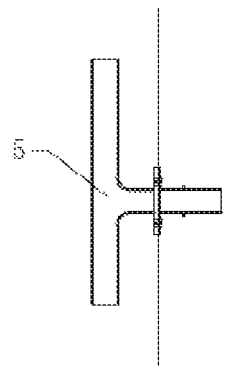
FIG. 5 is an enlarged schematic view for the structure of the connecting pipe of FIG. 4.

With reference to FIG. 4 and FIG. 5, for the sedimentation tank capable of automatically adjusting liquid level and flow of the present embodiment, the main structure of the sedimentation cell 1 is the same as that of embodiment 1, except that: two water inlets are formed in the inlet side of the connecting pipe 5, and one water outlet is formed in outlet side of the connecting pipe 5. Wherein one water inlet is formed above the connecting pipe 5, and the other water inlet is horizontally formed in the middle of the connecting pipe 5, and the lower water inlet formed in the middle of the connecting pipe 5 is used for discharging part of settled sewage to the next-stage sedimentation cell 1; when the liquid level in the sedimentation cell 1 reaches the discharge liquid level of the upper water inlet of the connecting pipe 5, and the upper water inlet and the lower water inlet are used for discharging part of settled sewage to the next-stage sedimentation cell 1; the higher the liquid level is, the larger the flow of the connecting pipe 5 is, the more obvious the effect of adjusting the liquid level in the sedimentation cell 1 is. And the direction of the water outlet is set horizontally.

Figure 6:
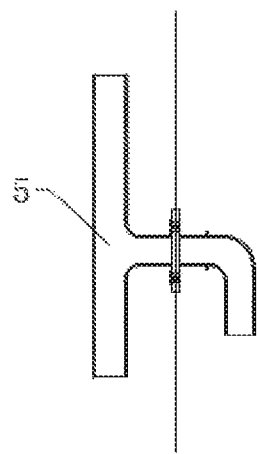
FIG. 6 is a schematic diagram of the connecting pipe according to an embodiment of the present disclosure.

As another embodiment of the present disclosure, with reference to FIG. 6, in the structure of the connecting pipe 5, the water outlet on the outlet side of the connecting pipe 5 faces downward, which may be seen as the impact on the sediment in the sedimentation cell 1 can be neglected.

Embodiment 3

Figure 7:
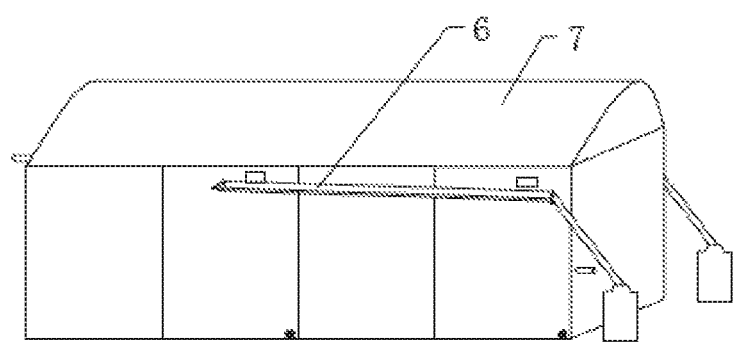
FIG. 7 is a schematic structural diagram of the sedimentation tank according to embodiment 3 of the present disclosure.

With reference to FIG. 7, for the sedimentation tank capable of automatically adjusting liquid level and flow of the present embodiment, the main structure of the sedimentation cell 1 is the same as that of embodiment 1, according to the difference among the separation of water and oil, the separation of water and slag, and the separation of oil and water slag, different structures of connecting pipe 5 can be selected specifically, so as to change the capacity of adjusting the liquid level and flow of the sedimentation cell 1, thereby improving the sedimentation effect.

The sediment discharge port 4 of the sedimentation cell 1 is provided with a switch valve for discharging precipitate by human after sedimentation is completed. Meanwhile, a collecting groove 6 used for collecting and discharging the grease blocks is arranged at two sides of the sedimentation cell 1 corresponding to grease discharge port 3; wherein one end of the collecting groove 6 is obliquely fixed on the two sides of the sedimentation cell 1 by screws, and the other end is used for collecting grease blocks into barrel through a transition chute.

Besides, a detachable protective cover 7 is arranged at the top of the sedimentation cell 1 so as to avoid the influence of externalized weather such as wind and sun on the settlement and to avoid the influence of odor and the like on the external environment.

Although the above describes a few different embodiments of the present disclosure, it will be apparent to those skilled in the art that the present disclosure is not limited to the details of the above-described exemplary embodiments.

At the same time, it should be understood that although the present specification is described according to the embodiments, not every embodiment includes only one independent technical solution. The description of the present specification is merely for the sake of clarity, and the person skilled in the art should take the specification as a whole, the technical solutions in the embodiments may also be combined as appropriate to form other embodiments that can be understood by those skilled in the art.

Nevertheless, the present disclosure should have the following advantages over the prior art, irrespective of which of the foregoing embodiments is used:

1. The sedimentation tank has a compact and attractive structure and high space utilization, and the structure can be flexibly selected according to the to-be-settled sewage; meanwhile, according to the difference of the separation of water and oil, the separation of water and slag, the separation of oil and water slag, different connecting pipe 5 structures can be selected specifically, so as to change the capacity of adjusting the liquid level and flow of the sedimentation cent thereby improving the sedimentation effect.

2. The settlement benefit of the sedimentation tank is high; the front end of the input port of the water inlet pipe is close to the wall in order to avoid the impact on sediment in the sedimentation cell 1; the connecting pipe 5 of the water inlet pipe 2 and the first-stage sedimentation cell 1 is arranged at a diagonal position, the connecting pipe 5 of a subsequent sedimentation cell 1 and the connecting pipe 5 of the previous primary sedimentation cell 1 are arranged at a diagonal position, in order to increase the sewage sedimentation distance, prolong the sewage sedimentation time and improve the sedimentation income.

3. The sedimentation tank is arranged as a multi-stage sedimentation cell 1 according to needs, so that the sewage separation effect after sedimentation is thorough, the separated products can be recycled, such as grease blocks and the like collected by the collecting groove 6, which can be used for producing the soap, oil refining and the like; the precipitate discharged from the bottom mainly comprises sludge, bone slag and the like, which can be used for producing the fertilizer, animal feed and the like through proper processing; water discharged from the last connecting pipe 5 can also be recycled for other use.

What is claimed is:

1. A sedimentation tank capable of automatically adjusting liquid level and flow, comprising two or more sedimentation cells which are connected in sequence, wherein,
    a water inlet pipe is arranged on the left side of the leftmost sedimentation cell in the process direction; the bottom of each stage of sedimentation cell is obliquely arranged and a grease discharge port used for discharging grease is formed at an upper level on the side that has the upper side of the inclined surface, and a sediment discharge port used for discharging precipitates is formed on the lower side; the adjacent sedimentation cells are connected in sequence through a connecting pipe, wherein the inclination direction of bottom of lower-stage sedimentation cell is opposite to the inclination direction of bottom of upper-stage sedimentation cell; the water inlet pipe and the connecting pipe of the leftmost sedimentation cell are respectively located at the diagonal positions of it, the diagonal is configured to mean that the inlet pipe and connection pipe are located at the two non-adjacent vertices of their plane; the connecting pipe of next-stage sedimentation cell and the connecting pipe of upper-stage sedimentation cell are located at the diagonal positions of the sedimentation cell respectively; a connecting pipe of the rightmost sedimentation cell are used for discharging water; the front end of the water inlet pipe is bent and the input port of it is close to the wall; the highest point of the connecting pipe is lower than the highest point of the grease discharge port of the corresponding sedimentation cell, when the liquid level in the sedimentation cell reaches the discharge liquid level of the connecting pipe, the connecting pipe automatically adjusts the flow according to different liquid level so as to adjust the liquid level of the sedimentation cell, and the settled sewage is discharged or discharged into the next-stage sedimentation cell until the last stage, and finally discharged.

2. The sedimentation tank capable of automatically adjusting liquid level and flow according to claim 1, the connecting pipe comprises one or more stainless steel pipes fixedly mounted through flanges and/or a length-adjustable telescopic pipe, wherein the connecting pipe is divided into inlet side and outlet side, one or two water inlets of the connecting pipe are formed in the inlet side, and one water outlet is formed in the outlet side.

3. The sedimentation tank capable of automatically adjusting liquid level and flow according to claim 2, one water inlet is formed in the inlet side of the connecting pipe, and one water outlet is formed in the outlet side; and an incomplete funnel-shaped water inlet device is arranged above the water inlet, and the top end of the water inlet device is inclined towards the inner side of the sedimentation cell; when the liquid level in the sedimentation cell reaches the discharge level of the connecting pipe, the higher the liquid level is, the larger the flow of the connecting pipe is, the better the effect of adjusting the liquid level in the sedimentation cell is.

4. The sedimentation tank capable of automatically adjusting liquid level and flow according to claim 3, a collecting groove used for collecting and discharging the grease blocks is arranged at two sides of the sedimentation cell corresponding to the grease discharge port; wherein one end of the collecting groove is obliquely fixed on the two sides of the sedimentation cell, and the other end is used for collecting grease blocks into barrel through a transition chute.

5. The sedimentation tank capable of automatically adjusting liquid level and flow according to claim 3, the direction of the water outlet is upward so as to reduce the impact of outflow on the sediment at the bottom of the sedimentation cell.

6. The sedimentation tank capable of automatically adjusting liquid level and flow according to claim 5, the outlet side of the connecting pipe is formed by a telescopic pipe, so as to adjust the height of outflow and reduce the impact of outflow on the sedimentation of the bottom of the sedimentation cell.

7. The sedimentation tank capable of automatically adjusting liquid level and flow according to claim 4, a detachable protective cover is arranged at the top of the sedimentation cell.

8. The sedimentation tank capable of automatically adjusting liquid level and flow according to claim 2, two water inlets are formed in the inlet side of the connecting pipe, and one water outlet is formed in the outlet side; wherein one of the water inlet is formed above the connecting pipe, and the other water inlet is horizontally formed in the middle or the lower part of the connecting pipe, and the lower water inlet is used for discharging part of settled sewage to the next-stage sedimentation cell;
    when the liquid level in the sedimentation cell reaches the discharge level of the upper water inlet of the connecting pipe, and the upper water inlet and the lower water inlet are used for discharging part of settled sewage to the next-stage sedimentation cell; the higher the liquid level is, the larger the flow of the connecting pipe is, the better the effect of adjusting the liquid level in the sedimentation cell is.

9. The sedimentation tank capable of automatically adjusting liquid level and flow according to claim 8, a collecting groove used for collecting and discharging the grease blocks is arranged at two sides of the sedimentation cell corresponding to the grease discharge port; wherein one end of the collecting groove is obliquely fixed on the two sides of the sedimentation cell, and the other end is used for collecting grease blocks into barrel through a transition chute.

10. The sedimentation tank capable of automatically adjusting liquid level and flow according to claim 9, a detachable protective cover is arranged at the top of the sedimentation cell.

11. The sedimentation tank capable of automatically adjusting liquid level and flow according to claim 1, the sediment discharge port is provided with a switch valve for discharging precipitate after sedimentation is completed.

12. The sedimentation tank capable of automatically adjusting liquid level and flow according to claim 1, a collecting groove used for collecting and discharging the grease blocks is arranged at two sides of the sedimentation cell corresponding to the grease discharge port; wherein one end of the collecting groove is obliquely fixed on the two sides of the sedimentation cell, and the other end is used for collecting grease blocks into barrel through a transition chute.

13. The sedimentation tank capable of automatically adjusting liquid level and flow according to claim 12, a detachable protective cover is arranged at the top of the sedimentation cell.

\* \* \* \* \*